United States Patent [19]

Price

[11] Patent Number: 5,630,865
[45] Date of Patent: May 20, 1997

[54] COLD GAS DRYER FOR COMPRESSED NATURAL GAS

[75] Inventor: Billy F. Price, Houston, Tex.

[73] Assignee: Price Compressor Company, Inc., Houston, Tex.

[21] Appl. No.: 540,854

[22] Filed: Oct. 11, 1995

[51] Int. Cl.⁶ ................................... B01D 53/26
[52] U.S. Cl. .................. 95/39; 95/290; 55/421; 55/DIG. 17
[58] Field of Search ................ 95/39, 41, 95, 95/117, 126, 290; 96/108, 147; 55/319, 421, 423, DIG. 17

[56] References Cited

U.S. PATENT DOCUMENTS

| | | | |
|---|---|---|---|
| 2,036,106 | 3/1936 | Stuard | 55/421 X |
| 2,838,131 | 6/1958 | Peterson | 55/319 |
| 3,091,097 | 5/1963 | Friant | 95/39 X |
| 3,864,102 | 2/1975 | Powers | 95/39 |
| 4,169,133 | 9/1979 | Staege | 95/39 X |
| 4,749,384 | 6/1988 | Nowobilski et al. | 96/108 X |
| 5,370,159 | 12/1994 | Price | 141/31 |
| 5,385,176 | 1/1995 | Price | 141/31 |

FOREIGN PATENT DOCUMENTS

| | | | |
|---|---|---|---|
| 0483283 | 5/1952 | Canada | 95/117 |
| 53-014167 | 2/1978 | Japan | 96/108 |
| 53-091470 | 8/1978 | Japan | 95/290 |
| 0460065 | 8/1975 | U.S.S.R. | 95/117 |
| 0912939 | 12/1962 | United Kingdom | 95/117 |

Primary Examiner—Robert Spitzer
Attorney, Agent, or Firm—Pravel, Hewitt, Kimball & Krieger

[57] ABSTRACT

A process and apparatus for dehydrating natural gas while filling a compressed natural gas storage vessel are provided. The natural gas is dehydrated through a process of compression, followed by expansion for cooling, and freezing or condensation of water from the cooled gas onto the surface of a moisture collecting material. The invention provides dehydrated compressed natural gas which can be used to supply natural gas vehicle filling stations.

11 Claims, 1 Drawing Sheet

COLD GAS DRYER FOR COMPRESSED NATURAL GAS

BACKGROUND OF THE INVENTION

1. Field of the Invention

The invention relates to dehydrating natural gas. More specifically, the invention provides an apparatus and process for dehydrating natural gas vehicle fuel while filling a compressed natural gas storage vessel for subsequent transfer to vehicle fuel tanks.

2. Description of the Related Art

In recent years, there has been considerable interest in using compressed natural gas as a fuel for vehicles. Applicant is named as inventor of several U.S. patents in this area, including: U.S. Pat. No. 5,370,159 entitled APPARATUS AND PROCESS FOR FAST FILLING WITH NATURAL GAS, and U.S. Pat. No. 5,385,176, entitled NATURAL GAS DISPENSING.

While growing concern about the environment, and more specifically about the quality of air, is spurring an interest in the use of compressed natural gas as a vehicular fuel, this technology presents several challenges.

These challenges include a significant corrosion problem. Corrosion fatigue is caused by a combination of corrosive agents found in natural gas—hydrogen sulfide, carbon dioxide, water (or water vapor)—which, together with the pressure cycling associated with the use of compressed natural gas equipment, results in the development of stress and corrosion cracks in the equipment. In order to limit these corrosive effects, standards have been developed for upper limits of water content in the compressed natural gas for use as a vehicular fuel.

In addition to the corrosion problem, water in compressed natural gas could freeze or form hydrates during handling, especially during desired fast-fill operations. The quantity of water in saturated natural gas at various pressures and temperatures can be estimated from correlations in the literature. Some of these correlations also show a hydrate-formation line indicating that solid hydrates form when the pressure of natural gas of a specific moisture content is suddenly reduced. For instance, if gas of typical pipeline composition (0.6 gravity) at 2000 psig and 120° F. is expanded to 400 psig, hydrates form if the gas contains more than 15 pounds of water per million standard cubic feet ("MMSCF"). At pressures below about 150 psia, on the other hand, cooling to 32° F. is necessary to precipitate a solid phase, when ordinary ice forms. The hydrates form more readily (i.e., at a higher temperature or lower pressure) with gases of greater density and less readily with very light gases. Thus, for example, at a pressure of 1,000 psia, hydrates form at about 62° F. in natural gas of about 0.60 specific gravity, while they form at about 67° and 71° F., respectively, in gases of 0.75 and 1.00 specific gravity. Thus, it may be expected that compressed natural gas at pressures ranging from about 3,000 to about 5,000 psig, would be highly susceptible to the formation of hydrates if the gas is saturated with water vapor or contains a significant amount of water vapor. Cooling of compressed natural gas owing to pressure reduction necessarily takes place during natural gas vehicle fueling operations, particularly in the case of quick-fill systems.

It is known to remove water from gases by contacting the wet gas with a dehydrating solution that contains a substance that either absorbs or reacts with water. In this process, water vapor is transferred from the gas to the dehydrating solution and dried gas is obtained. Desirably, the dehydrating solution, now containing removed water as a liquid, is regenerated (i.e. dried) and recycled. The regeneration steps typically used include several stages of heating the dehydrating solution to drive off water as water vapor. The substantially water-free dehydrating solution is then recycled for contacting with wet gas.

Typically, the gas industry uses fairly complex gas dryers having very large capacities, ranging up to 75 MMSCF per day. These gas dryers include a wet gas dehydrating solution contactor and a dehydrating solution regenerator. U.S. Pat. No. 3,105,748 shows a glycol regenerator utilizing a still column for distilling wet glycol and removing water vapor. Glycol circulation rates vary from about 2 to about 5 gallons of glycol per pound of water to be removed. Thus, to remove 20 lbs. of water per MMSCF, from about 40 to about 100 gallons of glycol should be available for each MMSCF throughput.

It is also known to remove water from natural gas using dry-bed dehydration units. These units used a solid material called a desiccant to adsorb water from the natural gas. Typical desiccants included silica gel, activated alumina, and molecular sieves. When the desiccant became saturated, it had to be regenerated to restore its adsorptive capacity. Regeneration of a desiccant was usually accomplished by heating. Hot gas vaporized the water from the desiccant. A dry-bed dehydrator generally required at least two vessels filled with desiccant so one bed could be drying while the second was regenerating.

When dry-bed dehydration units were used to dry natural gas for use in natural gas vehicle filling stations, the drying process occurred simultaneously with filling of the compressed gas storage vessel. The gas was dried by taking a stream off of a lower stage of the compressor, delivering the gas to a drying system, and returning the dried gas to the next compressor stage. This process delivered compressed natural gas to the storage vessel which was hot due to the heat of compression. As the gas in the vessel cooled, it approached its dew point and there is a risk that residual contained water would condense.

SUMMARY OF THE INVENTION

The present invention provides for the dehydration of natural gas that can be used during the filling operation of compressed gas storage vessels at natural gas vehicle filling stations. As used in connection with the present invention, the term "natural gas" refers to hydrocarbon gases suitable for use as vehicle fuels, typically commercial methane.

In the present invention, natural gas is taken from a utility supply line, compressed using a gas compressor, dehydrated, and used to fill a compressed gas storage vessel.

The dehydration is accomplished by rapidly dropping the compressed gas pressure across a restricting valve or orifice to a pressure about the same as contained in the gas storage vessel. This pressure drop cools the gas. The cold gas is then exposed to a moisture collecting material. Water contained in the gas freezes or condenses onto the moisture collecting material.

At the beginning of this process the pressure inside the gas storage vessel is low. The pressure inside the gas storage vessel increases as the dehydrated gas fills the gas storage vessel. The pressure on the gas storage vessel is monitored by instrumentation so that when the storage vessel pressure approaches the compressor discharge pressure the restricting valve opens automatically and eliminates the rapid pressure drop.

Because there is no rapid pressure drop to cool the gas before it contacts the moisture collecting material, the gas, warmed by the heat of compression, melts any water frozen on the moisture collecting material. This accumulated water drops to a suitable accumulation point where it can then be drained.

The present invention accordingly meets a need which has, so far as is known, been unmet for reducing or eliminating the problems of hydrate formation and corrosion caused by the presence of water in compressed natural gas. This is done with a relatively low capital investment and meeting safety and environmental concerns. This process also results in a gas storage vessel temperature which is much lower after filling than is achieved using conventional filling and drying methods.

BRIEF DESCRIPTION OF THE DRAWINGS

A better understanding of the invention can be obtained when the detailed description set forth below is reviewed in conjunction with the accompanying drawings, in which.

DESCRIPTION OF PREFERRED EMBODIMENT

Figure 1:
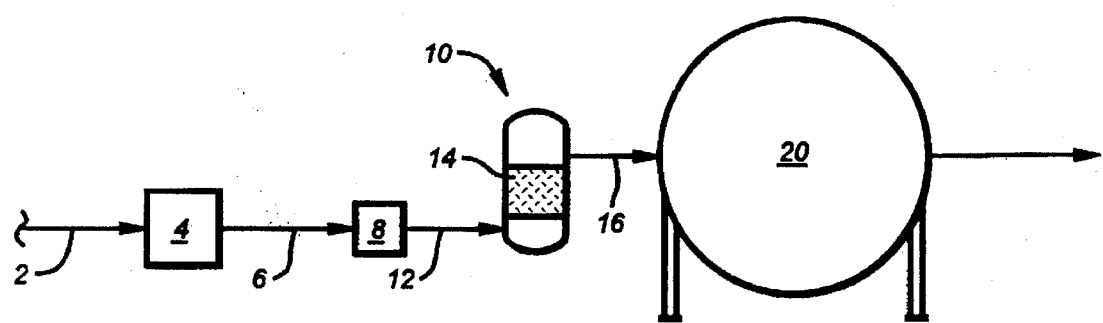
FIG. 1 is a schematic diagram of a system for dehydrating compressed natural gas according to the present invention.

As shown in FIG. 1, a system of the present invention for dehydrating natural gas while filling a compressed natural gas storage vessel includes a gas storage vessel 20. The gas storage vessel 20 is used for example at a compressed natural gas filling station to store compressed natural gas to later be withdrawn to fill fuel tanks on natural gas powered vehicles. The gas storage vessel 20 is designed to store compressed natural gas at a suitable pressure, typically about 4000 psi. In the preferred embodiment of the invention, the gas storage vessel can hold approximately 10,000 standard cubic feet of gas. However, the size of the vessel may be adjusted depending upon the particular needs of the natural gas vehicle filling station.

The present invention may be used for both initial filling of the gas storage vessel 20 or for subsequent refills. After an initial filling, as compressed natural gas is withdrawn from the gas storage vessel 20, the pressure in the gas storage vessel 20 decreases. When the pressure in the gas storage vessel 20 drops to a certain level, typically approximately 1000 psi, it becomes necessary to begin the process of refilling and dehydrating. For gas storage vessels 20 that were initially empty, the process of initial filling and dehydrating is the same as that for refilling and dehydrating.

Natural gas is supplied from a pipeline or transport vessel at a relatively low pressure (about 5 psi) through conduit 2 to the suction of a compressor 4. The compressor 4 compresses the natural gas up to a predetermined pressure, typically about 4000 psi through a discharge line 6. The compressor discharge line 6 pressure is maintained constant by using a back pressure controller 8.

The back pressure controller 8 restricts the gas flow by reducing the cross sectional flow area relative to the compressor discharge line 6. This restricting of the gas flow may be accomplished, for example, by either a fixed orifice or a control valve. The restriction in the gas flow caused by the back pressure controller 8 results in a rapid pressure drop across the back pressure controller 8.

From the back pressure controller 8, the gas moves to a cold gas dryer 10 through a cold gas dryer inlet line 12. In the cold gas dryer 10, the gas is contacted with a moisture collecting material 14 in a manner described below. After being dehydrated in the cold gas dryer 10, the gas moves to the gas storage vessel 20 through a cold gas dryer exit line 16. During filling of the gas storage vessel 20, the magnitude of the rapid pressure drop caused in the back pressure controller 8 varies. When the process of refilling begins, the pressure on the compressor discharge line 6 is typically about 4000 psi, the pressure on the cold dry inlet line 12 is typically about 1000 psi, and the resulting pressure drop across the back pressure controller is about 3000 psi. As the gas storage vessel 20 is refilled the pressure on the gas storage vessel 20 and on the cold gas dryer inlet line 12, rises. Thus, the pressure drop across the back pressure controller 8 decreases. For example, when the gas storage vessel 20 pressure rises to about 2000 psi, the resulting pressure drop across the back pressure controller 8 is reduced to about 2000 psi.

The rapid pressure drop across the back pressure controller 8 results in a large decrease in the gas temperature. The temperature of the compressed gas drops approximately 50° F. for each 1000 psi of pressure drop. The gas then flows into the cold gas dryer 10 where the gas is contacted with a moisture collecting material 14 for drying. After drying, the gas flows out of outlet 21 into the dryer exit line 16 and into the gas storage vessel 20.

An appreciable amount of the water contained in the compressed gas freezes out or condenses upon the surface of the moisture collecting material 14. The moisture collecting material 14 in the cold gas dryer 10 is a packing material that contains a large surface area per unit volume and is capable of withstanding large temperature fluctuations. A stainless steel mesh wire is one example of a moisture collecting material 14. Other packing materials, such as Rasching rings, Pall rings, Berl saddles or ceramic marbles are also suitable for use in this invention.

Figure 2:
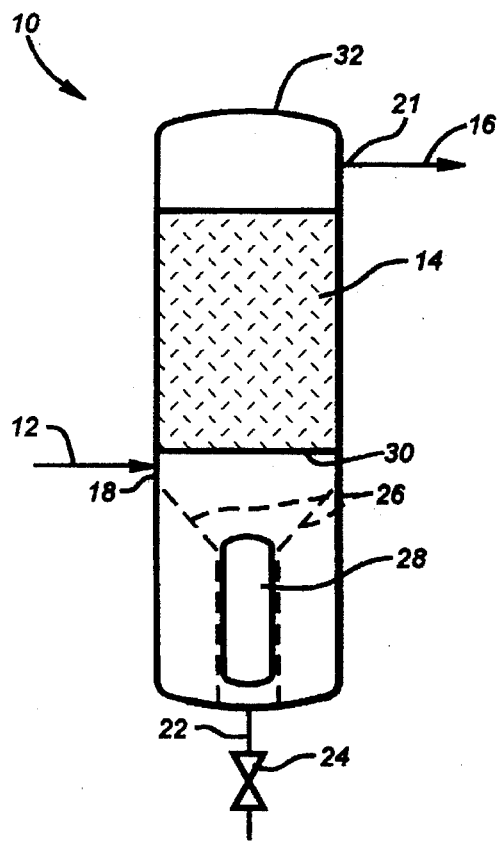
FIG. 2 is an elevation, taken in cross section of a cold gas dryer used in FIG. 1.

The cold gas dryer 10 (FIG. 2) includes a cylindrical vessel 32 with an inlet 18 connected to the cold gas dryer inlet line 12 at a location near the bottom of the cylindrical vessel 32. Above the inlet 18 is a support 30 such as a perforated plate or screen to hold the moisture collecting material 14. The moisture collecting material 14 is placed above the support 30. The outlet 21 is just above the moisture collecting material.

The cold gas dryer 10 preferably has an accumulated water collector 26 which directs collected water toward a liquid outlet 22. A valve 24 on the liquid outlet can be opened to remove collected water after gas dehydration. If desired, a water absorbing material 28, such as an absorbing filter for example, may be placed in the dryer 10 between the water collector 26 and the outlet 22.

The cold gas dryer 10 is sized based on the gas flow rate coming from the compressor 4. The diameter of the cylindrical vessel 32, the depth of moisture collecting material 14, and other components are sized in reference to the specific flow rate for each particular application of the invention, using conventional engineering practices.

The pressure on the gas storage vessel 20 is monitored by conventional instrumentation for drying control purposes. When the pressure on the gas storage vessel 20 reaches a suitable pressure, typically about 3000 psi, the back pressure controller 8 is disengaged from the system eliminating the rapid pressure drop. Without the rapid pressure drop to cool the compressed gas, the gas temperature in the gas storage vessel 20 slowly rises. The rising gas temperature causes the frozen or condensed water to release from the surface of the moisture collecting material 14 and accumulate in the base of the cold gas dryer 10. A computer control system can be used for drying control to monitor the pressure on the gas storage vessel 20 and open the back pressure controller 8 in response to measured pressures, if desired.

The dehydrated gas flows from outlet 21 of cold gas dryer 10, through the cold gas dryer exit line 16, directly into the gas storage vessel 20. The compressed, dehydrated gas in vessel 20 is then available for subsequent transfer to vehicle fuel tanks. The cold gas dryer 10 can be mounted directly on and connected to the gas storage vessel 20 minimizing piping and supports, if desired.

The amount of water removed from the compressed natural gas varies during the filling process. A higher percentage of the contained moisture is removed during the beginning stages of filling than is removed in the later stages. For natural gas streams with approximately 20 pounds water per MMSCF of natural gas, the average moisture content of the filled gas storage vessel typically obtained with the present invention is below about 7 pounds water per MMSCF.

From the foregoing, it can be seen that the present invention removes water contained in natural gas during the process of filling compressed gas storage vessels. Additionally, the present invention provides a compressed gas dehydrating process that requires a relatively low capital investment and avoids the problems associated with regeneration of dehydrants. Further, with the present invention, one is able to deliver the dehydrated compressed natural gas to the gas storage vessel at a temperature lower that conventional filling and drying methods can achieve. This allows more complete filling of the gas storage vessel 20.

It should be understood that there can be improvements and modifications made to the embodiments of the invention described in detail above without departing from the spirit or scope of the invention, as set forth in the accompanying claims.

What is claimed is:

1. A process for dehydrating natural gas vehicle fuel while filling a compressed natural gas storage vessel for subsequent transfer of the gas to vehicle fuel tanks comprising:

supplying natural gas to a compressor;

compressing the natural gas to a pressure equal to a pressure desired in the compressed natural gas storage vessel at completion of filling;

rapidly reducing the pressure of the natural gas to a pressure about the same as a pressure contained in the compressed natural gas storage vessel during filling;

directing the natural gas across a moisture collecting material; and supplying the natural gas to the compressed natural gas storage vessel.

2. The process of claim 1, further comprising:

discontinuing rapid pressure reduction as the pressure of the storage vessel reaches 3000 psi.

3. The process of claim 1, wherein the compressing is from about 5 psi to about 4000 psi.

4. The process of claim 1, wherein the natural gas supplied to the compressor is supplied from a pipeline.

5. The process of claim 1, wherein the moisture content of the natural gas supplied is less than 20 pounds per million standard cubic feet of gas.

6. A system for drying natural gas vehicle fuel while filling a compressed natural gas storage vessel for subsequent transfer of the gas to vehicle fuel tanks, comprising:

a compressor for compressing natural gas and providing the compressed natural gas;

a pressure controlling means for receiving the compressed natural gas from said compressor, and keeping a substantially constant discharge pressure on said compressor while inducing a pressure drop in the natural gas stream;

a dehydrator vessel containing a moisture collecting material having a large surface area for contacting natural gas and dehydrating same; and a storage vessel for receiving the dehydrated compressed natural gas and storing same for dispensing as a vehicle fuel.

7. The system of claim 6, wherein the pressure controlling means comprises a control valve.

8. The system of claim 6, wherein the moisture collecting material comprising stainless steel mesh wire.

9. The system of claim 6, wherein the substantially constant discharge pressure maintained on the compressor by the pressure controlling means is about 4000 psi.

10. The system of claim 6, wherein the dehydrator contains a means for absorbing collected water in the base of the dehydrator vessel.

11. The system of claim 6, wherein the compressed natural gas is dried to a moisture content less than 7.0 pounds/million standard cubic feet of gas.

* * * * *